(12) United States Patent
Patel et al.

(10) Patent No.: US 6,338,160 B1
(45) Date of Patent: Jan. 8, 2002

(54) CONSTANT POOL REFERENCE RESOLUTION METHOD

(75) Inventors: Mukesh K. Patel, Fremont; Chitrabhanu Dasgupta, Mountain View, both of CA (US)

(73) Assignee: Nazomi Communications, Inc., Santa Clara, CA (US)

( * ) Notice: Subject to any disclaimer, the term of this patent is extended or adjusted under 35 U.S.C. 154(b) by 0 days.

(21) Appl. No.: 09/488,186

(22) Filed: Jan. 20, 2000

Related U.S. Application Data

(63) Continuation-in-part of application No. 09/208,741, filed on Dec. 8, 1998.

(51) Int. Cl.⁷ .................................................. G06F 9/15
(52) U.S. Cl. .................... 717/5; 717/4; 717/7; 717/11; 709/316
(58) Field of Search .................... 717/5, 4, 7, 11, 717/316

(56) References Cited

U.S. PATENT DOCUMENTS

| | | | |
|---|---|---|---|
| 5,265,206 A | * 11/1993 | Shakelford et al. | 709/316 |
| 5,307,492 A | * 4/1994 | Benson | 717/7 |
| 5,313,614 A | * 5/1994 | Goettelmann et al. | 395/500 |
| 5,367,685 A | * 11/1994 | Gosling | 717/7 |
| 5,584,026 A | * 12/1996 | Knudsen et al. | 707/1 |
| 5,740,441 A | * 4/1998 | Yellin et al. | 717/4 |
| 5,903,899 A | * 5/1999 | Steele, Jr. | 707/206 |
| 5,920,720 A | * 7/1999 | Toutonghi et al. | 717/5 |
| 5,953,736 A | * 9/1999 | O'Connor et al. | 711/6 |
| 5,966,542 A | * 10/1999 | Tock | 717/11 |
| 6,052,526 A | * 4/2000 | Chatt | 717/5 |
| 6,067,577 A | * 5/2000 | Beard | 709/305 |
| 6,071,317 A | * 6/2000 | Nagel | 717/4 |
| 6,085,198 A | * 7/2000 | Skinner et al. | 707/103 |
| 6,151,702 A | * 11/2000 | Overturf et al. | 717/5 |
| 6,275,984 B1 | * 8/2001 | Morita | 717/5 |

OTHER PUBLICATIONS

L. Lemay and C. L. Perkins, "Teach Yourself JAVA 1.1 in 21 Days," second edition, pp. 621–675 (1997).

* cited by examiner

*Primary Examiner*—Mark R. Powell
*Assistant Examiner*—Chameli Chaudhuri Das
(74) *Attorney, Agent, or Firm*—Burns Doane Swecker & Mathis LLP

(57) ABSTRACT

An implementation of Java is disclosed in which references to the constant pool are implemented by using a Data Resolution Field within the constant pool entry. The Data Resolution Field acts as an index to a jump table to jump to resolve the reference or to perform the bytecode instruction. When the reference is resolved, the contents of the Data Resolution Field in the constant pool entry are modified so that the next time the bytecode is run, the resolution steps need not be done.

22 Claims, 13 Drawing Sheets

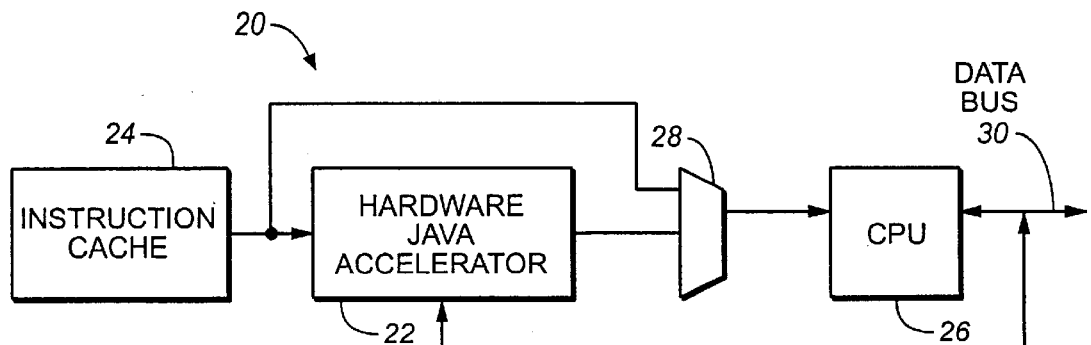
FIG._1
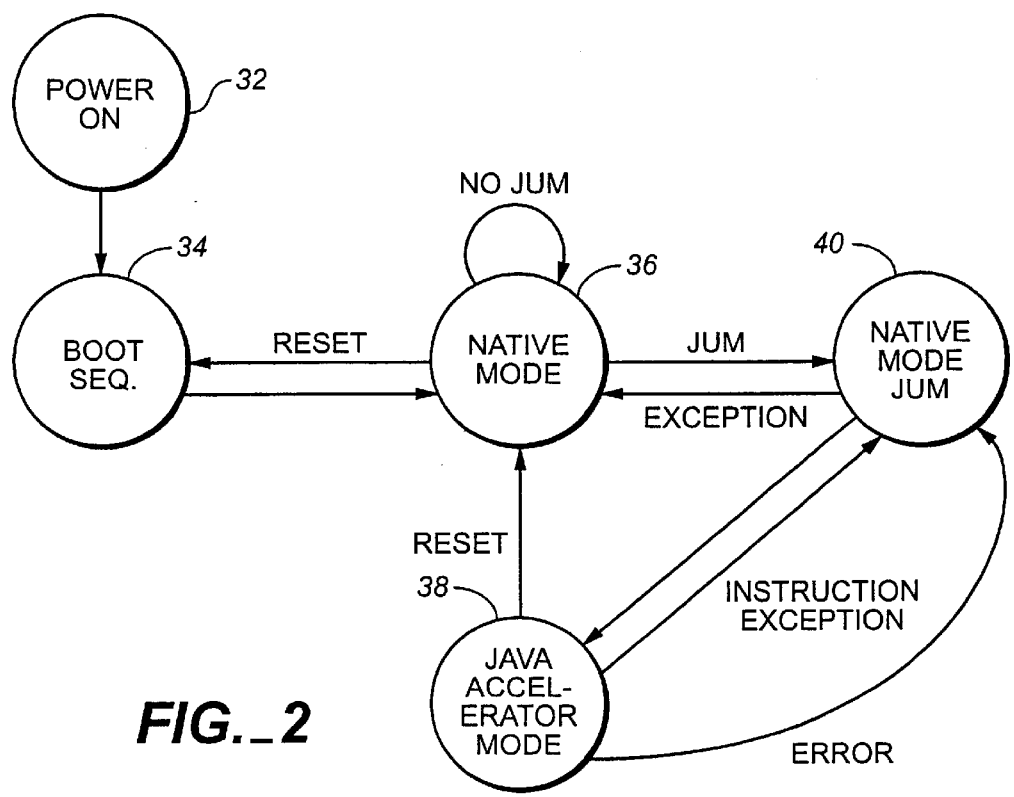
FIG._2

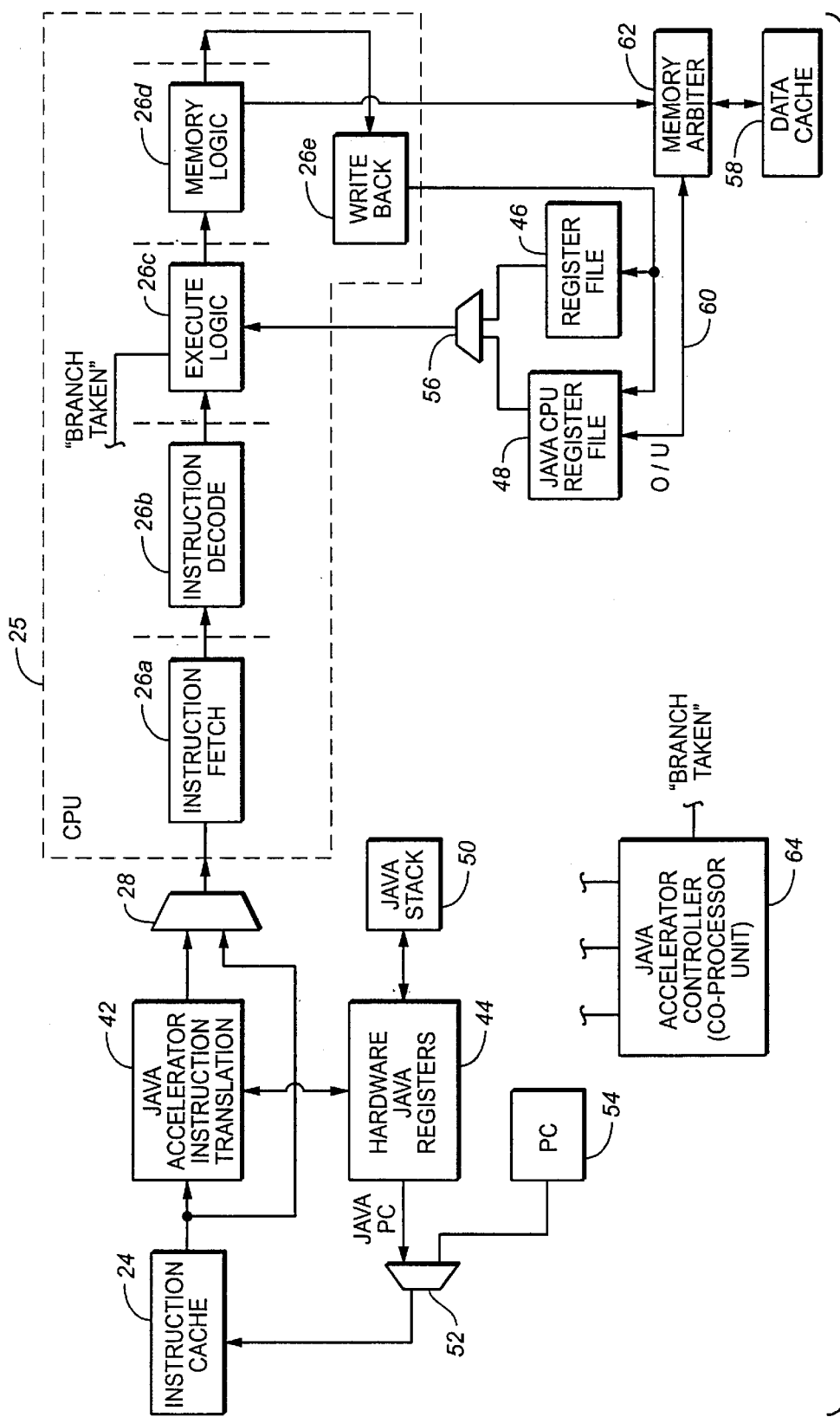
FIG._3

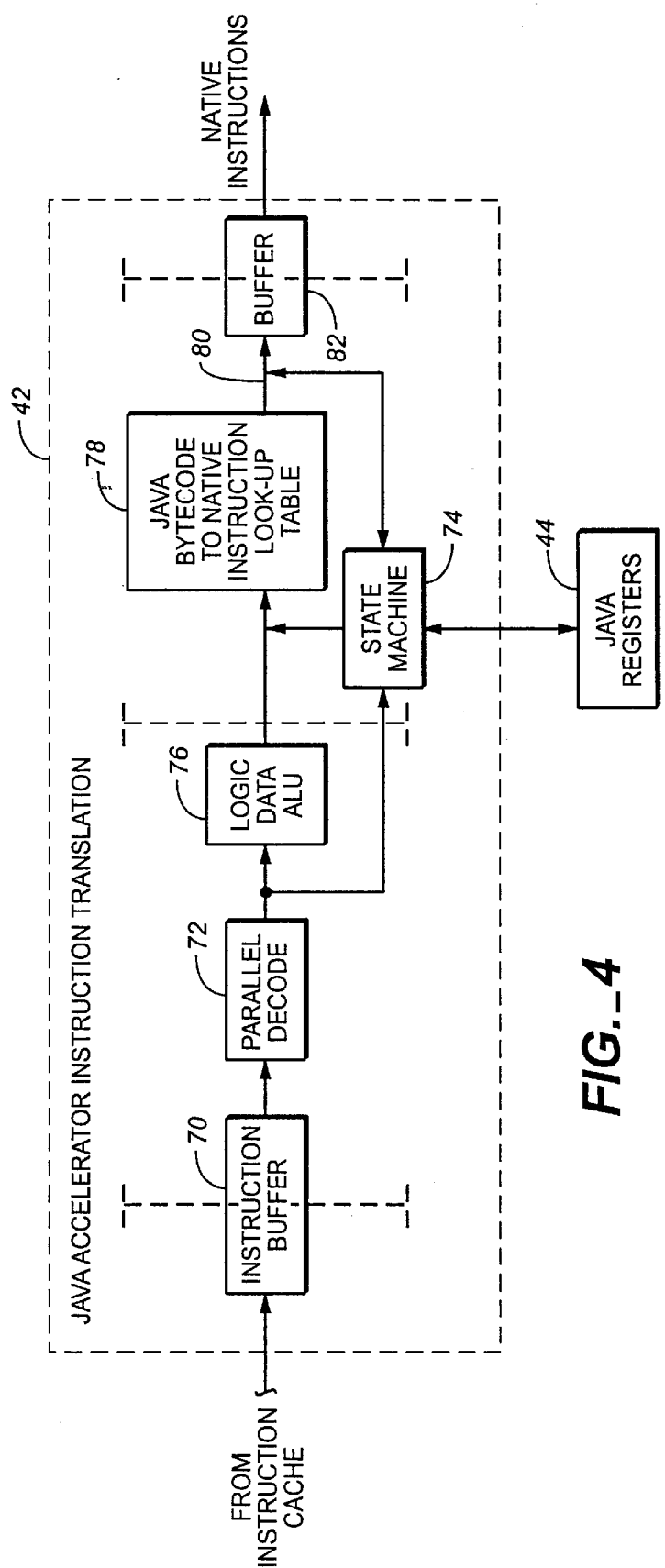
FIG._4

I. INSTRUCTION TRANSLATION

JAVA
BYTECODE                                  NATIVE
                                                              INSTRUCTION iadd                                                          ADD R1, R2

II. JAVA REGISTER

PC = VALUE A                              PC = VALUE A + 1
OPTOP = VALUE B                                               OPTOP = VALUE B - 1
        (R1)                                                          (R2)
VAR = VALUE C                                                 VAR = VALUE C

III. JAVA CPU REGISTER FILE

R0  0001                                          R0  0001
CONTAINS VALUE  → R1  0150                    NOT A VALID     → R1  0150
       OF TOP OF  R2  1210      STACK VALUE                 R2  1360
 OPERAND STACK   R3  0007                   CONTAINS VALUE    → R3  0007
                  R4  0005                   OF THE TOP OF                      R4  0005
                  R5  0006                  OPERAND STACK                       R5  0006
CONTAINS FIRST  → R6  1221                                                      R6  1221
      VARIABLE   R7  1361                                                       R7  1361

IV. MEMORY

OPTOP = VALUE B  → -  0150                                                   -  0150
    (VALUE B - 1) -  1210       OPTOP = VALUE B - 1  -  1360
                  -  0007                                                    -  0007
                  -  0005                                                    -  0005
                  -  0006                                                    -  0006
                  -  0001                                                    -  0001
                  -  4427                                                    -  4427
                  ~~~~~~                                                     ~~~~~~
 VAR = VALUE C   -  1221                                  VAR = VALUE C   -  1221
                  -  1361                                                    -  1361
                  -  1101                                                    -  1101

*FIG._5*

I. INSTRUCTION TRANSLATION

JAVA BYTECODE                           NATIVE INSTRUCTION iload_n           ⇨
iadd                                    ADD R6, R1

II. JAVA REGISTER

PC = VALUE A                            PC = VALUE A + 2
OPTOP = VALUE B    ⇨                    OPTOP = VALUE B
       (R1)                                    (R1)
VAR = VALUE C                           VAR = VALUE C

III. JAVA CPU REGISTER FILE

R0  0001                              R0  0001
CONTAINS     → R1  0150                   CONTAINS   → R1  1371
VALUE OF           R2  1210               VALUE OF       R2  1210
TOP OF       ⇨                            TOP OF
OPERAND STACK  R3  0007                   STACK          R3  0007
                    R4  0005                              R4  0005
                    R5  0006                              R5  0006
CONTAINS FIRST → R6  1221                 CONTAINS   → R6  1221
VARIABLE           R7  1361               FIRST          R7  1361
                                          VARIABLE

IV. MEMORY

OPTOP = VALUE B →  - 0150                 OPTOP = VALUE B  - 1371
                   - 1210                                  - 1210
                   - 0007      ⇨                           - 0007
                   - 0005                                  - 0005
                   - 0006                                  - 0006
                   - 0001                                  - 0001
                   - 4427                                  - 4427

VAR = VALUE C   -  1221                   VAR = VALUE C  - 1221
                -  1361                                  - 1361
                -  1101                                  - 1101

| Opcodes Mnemonic | Opcode xHH | Excep Gen |
|---|---|---|
| nop | 0x00 | |
| aconst_null | x01 | |
| iconst_m1 | x02 | |
| iconst_n(0-5) | x03 - x08 | |
| lconst_n(0-1) | x09 - x0a | |
| fconst_n(0-2) | x0c - x0d | |
| dconst_n(0-1) | x0e - x0f | |
| bipush | x10 | |
| sipush | x11 | |
| ldc | x12 | y |
| ldc_w | x13 | y |
| ldc2_w | x14 | y |
| iload | x15 | |
| lload | x16 | |
| fload | x17 | |
| dload | x18 | |
| aload | x19 | |
| iload_n(0-3) | x1a - x1d | |
| lload_n(0-3) | x1e - x21 | |
| fload_n(0-3) | x22 - x25 | |
| dload_n(0-3) | x26 - x29 | |
| aload_n(0-3) | x2a - x2d | |
| iaload | x2e | |
| laload | x2f | |
| faload | x30 | |
| daload | x31 | |
| aaload | x32 | |
| baload | x33 | |
| caload | x34 | |
| saload | x35 | |
| istore | x36 | |
| lstore | x37 | |
| fstore | x38 | |
| dstroe | x39 | |
| astroe | x3a | |
| istore_n(0-3) | x3b - x3e | |
| lstore_n(0-3) | x3f - x42 | |
| fstore_n(0-3) | x43 - x46 | |
| dstore_n(0-3) | x47 - x4a | |
| astore_n(0-3) | x4b - x4e | |
| iastore | x4f | |
| lastore | x50 | |
| fastroe | x51 | |
| dastore | x52 | |
| bastore | x53 | |
| aastore | x54 | |
| castroe | x55 | |
| sastore | x56 | |

FIG._7A

| | | |
|---|---|---|
| pop | x57 | |
| pop2 | x58 | |
| dup | x59 | |
| dup_x1 | x5a | |
| dup_x2 | x5b | |
| dup2 | x5c | |
| dup2_x1 | x5d | |
| dup2_x2 | x5e | |
| swap | x5f | |
| iadd | x60 | |
| ladd | x61 | |
| fadd | x62 | y |
| dadd | x63 | y |
| isub | x64 | |
| lsub | x65 | |
| fsub | x66 | y |
| dsub | x67 | y |
| imul | x68 | |
| lmul | x69 | |
| fmul | x6a | y |
| dmul | x6b | y |
| idiv | x6c | y |
| ldiv | x6d | y |
| fdiv | x6e | y |
| ddiv | x6f | y |
| irem | x70 | y |
| lrem | x71 | y |
| frem | x72 | y |
| drem | x73 | y |
| ineg | x74 | |
| lneg | x75 | |
| fneg | x76 | y |
| dneg | x77 | y |
| ishl | x78 | |
| lshl | x79 | |
| ishr | x7a | |
| lshr | x7b | |
| iushr | x7c | |
| lushr | x7d | |
| iand | x7e | |
| land | x7f | |
| ior | x80 | |
| lor | x81 | |
| ixor | x82 | |
| lxor | x83 | |
| iinc | x84 | |
| i2l | x85 | y |
| i2f | x86 | y |
| i2d | x87 | y |
| l2i | x88 | y |
| l2f | x89 | y |
| l2d | x8a | y |

*FIG._7B*

| | | |
|---|---|---|
| f2i | x8b | y |
| f2l | x8c | y |
| f2d | x8d | y |
| d2i | x8e | y |
| d2l | x8f | y |
| d2f | x90 | y |
| i2b | x91 | |
| i2c | x92 | |
| i2s | x93 | |
| lcmp | x94 | y |
| fcmpl | x95 | y |
| fcmpg | x96 | y |
| dcmpl | x97 | y |
| dcmpg | x98 | y |
| ifeq | x99 | |
| ifne | x9a | |
| iflt | x9b | |
| ifge | x9c | |
| ifgt | x9d | |
| ifle | x9e | |
| if_icmpeq | x9f | |
| if_icmpne | xa0 | |
| if_icmplt | xa1 | |
| if_acmpge | xa2 | |
| if_cmpgt | xa3 | |
| if_icmple | xa4 | |
| if_acmpeq | xa5 | |
| if_acmpne | xa6 | |
| goto | xa7 | |
| jsr | xa8 | |
| ret | xa9 | |
| tableswitch | xaa | y |
| lookupswitch | xab | y |
| ireturn | xac | |
| lreturn | xad | |
| freturn | xae | |
| dreturn | xaf | |
| areturn | xb0 | |
| return | xb1 | |
| getstatic | xb2 | y |
| putstatic | xb3 | y |
| getfield | xb4 | y |
| putfield | xb5 | y |
| invokevirtual | xb6 | y |
| invokespecial | xb7 | y |
| invokestatic | xb8 | y |
| invokeinterface | xb9 | y |
| xxunsedxxx | xba | y |
| new | xbb | y |
| newarray | xbc | y |
| anewarray | xbd | y |
| arraylength | xbe | y |

FIG._7C

| | | |
|---|---|---|
| athrow | xbf | y |
| checkcast | xc0 | y |
| instanceof | xc1 | y |
| monitorenter | xc2 | y |
| monitorexit | xc3 | y |
| wide | xc4 | y |
| multianewarray | xc5 | y |
| ifnull | xc6 | y |
| ifnonnull | xc7 | y |
| goto_w | xc8 | |
| jsr_w | xc9 | |
| | | |
| | | |
| ldc_quick | xcb | y |
| ldc_w_quick | xcc | y |
| ldc2_w_quick | xcd | y |
| getfield_quick | xce | y |
| putfield_quick | xcf | y |
| getfield2_quick | xd0 | y |
| putfield2_quick | xd1 | y |
| getstatic_quick | xd2 | y |
| putstatic_quick | xd3 | y |
| gtestatic2_quick | xd4 | y |
| putstatic2_quick | xd5 | y |
| invokevirtual_quick | xd6 | y |
| invokenonvirtual_quick | xd7 | y |
| invokesuper_quick | xd8 | y |
| invokestatic_quick | xd9 | y |
| invokeinterface_quick | xda | y |
| invokevirtualobject_quick | xdb | y |
| new_quick | xdc | y |
| anewarray_quick | xde | y |
| multinewarray_quick | xdf | y |
| checkcast_quick | xe0 | y |
| instanceof_quick | xe1 | y |
| invokevirtual_quick_w | xe2 | y |
| getfield_quick_w | xe3 | y |
| putfield_quick_w | xe4 | y |
| | | |
| | | |
| breakpoint | xca | y |
| impdep1 | xfe | y |
| impdep2 | xff | y |

FIG._7D

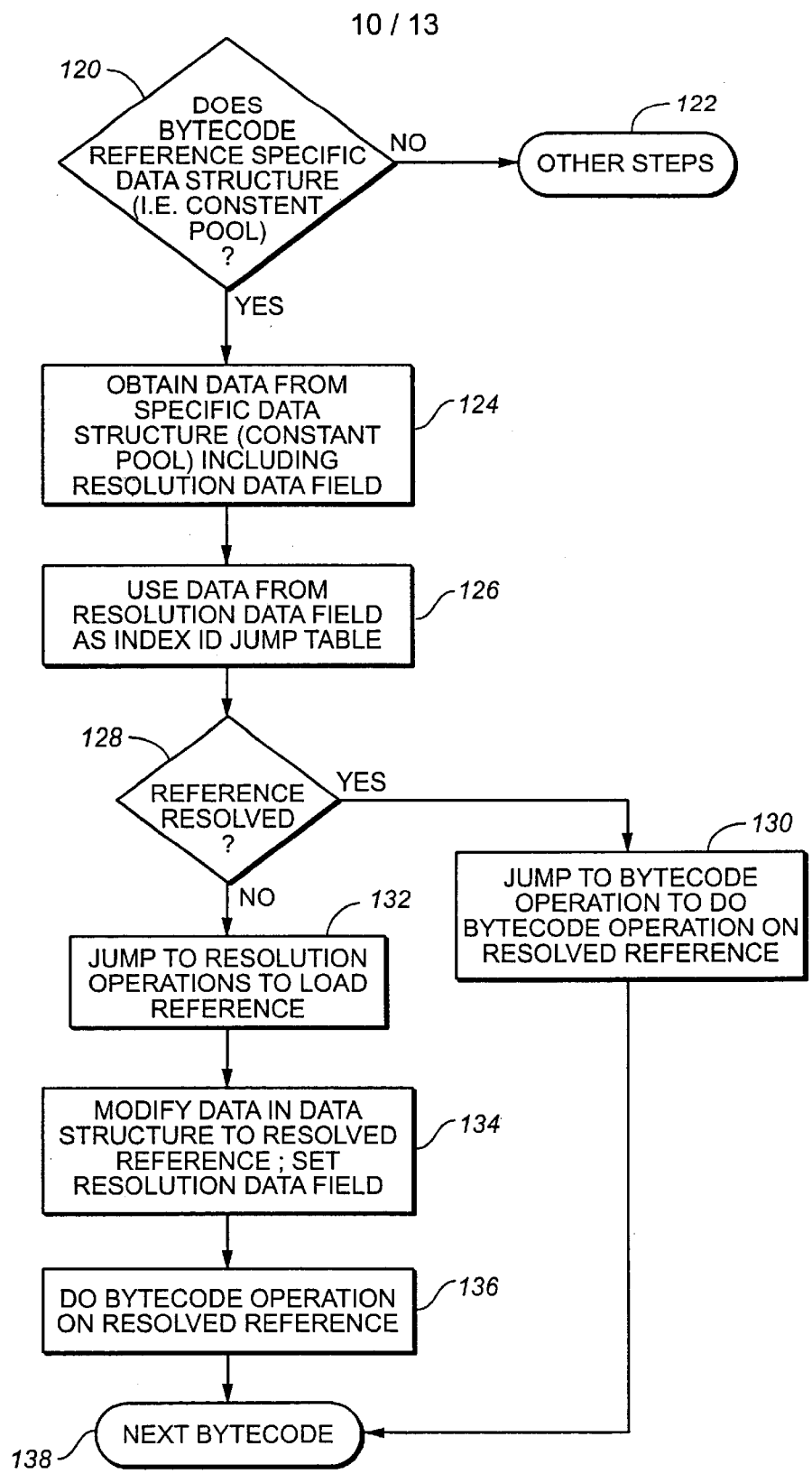
FIG._8

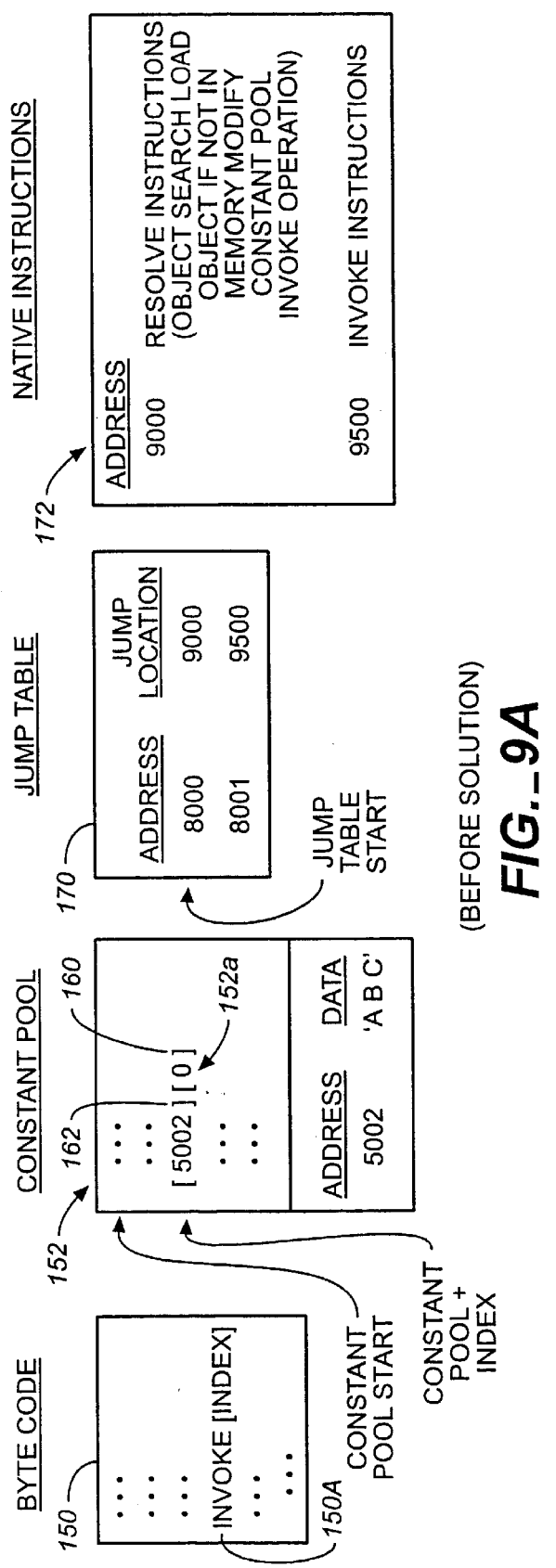
FIG._9A (BEFORE SOLUTION)

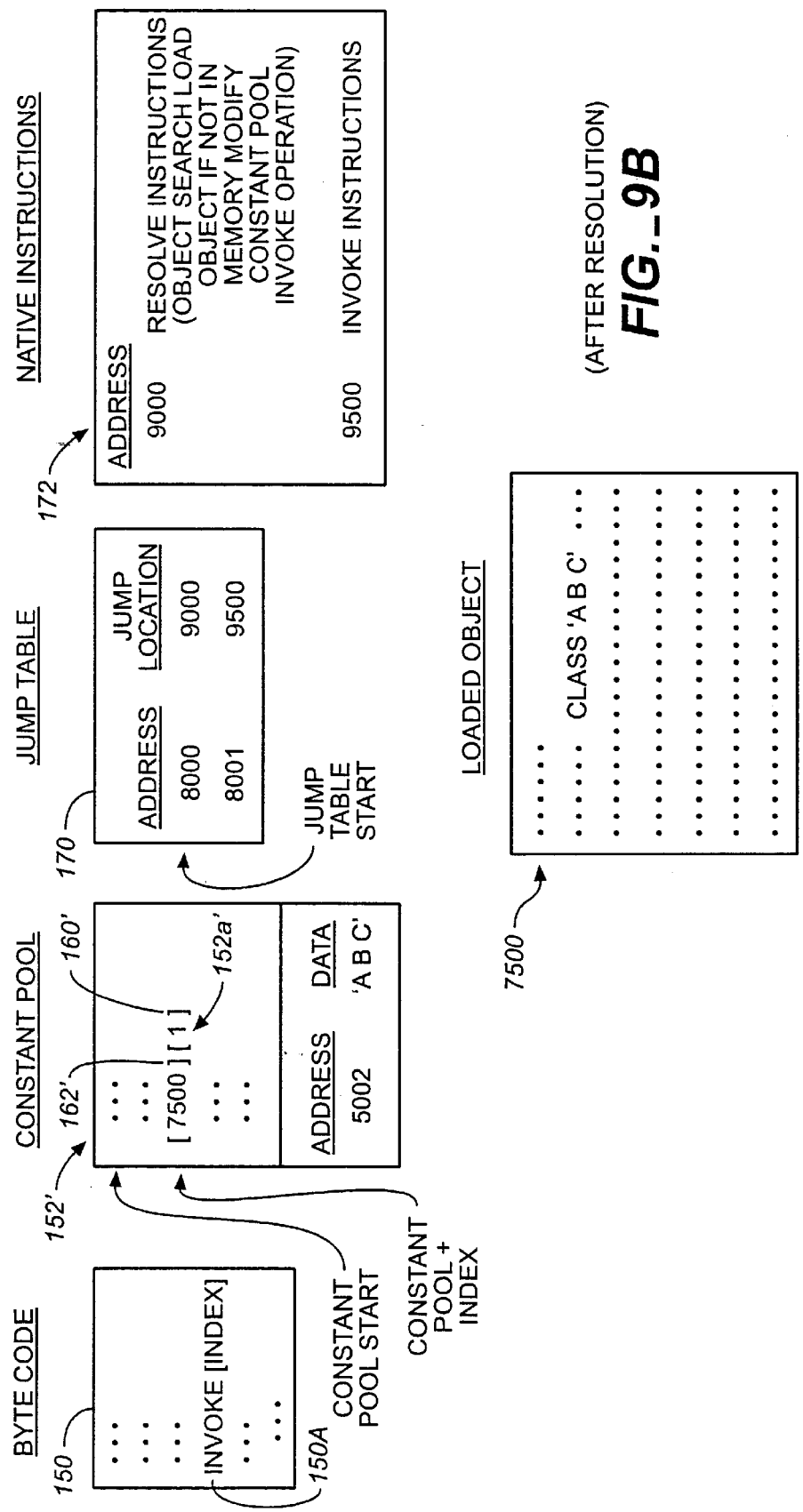
FIG._9B
(AFTER RESOLUTION)

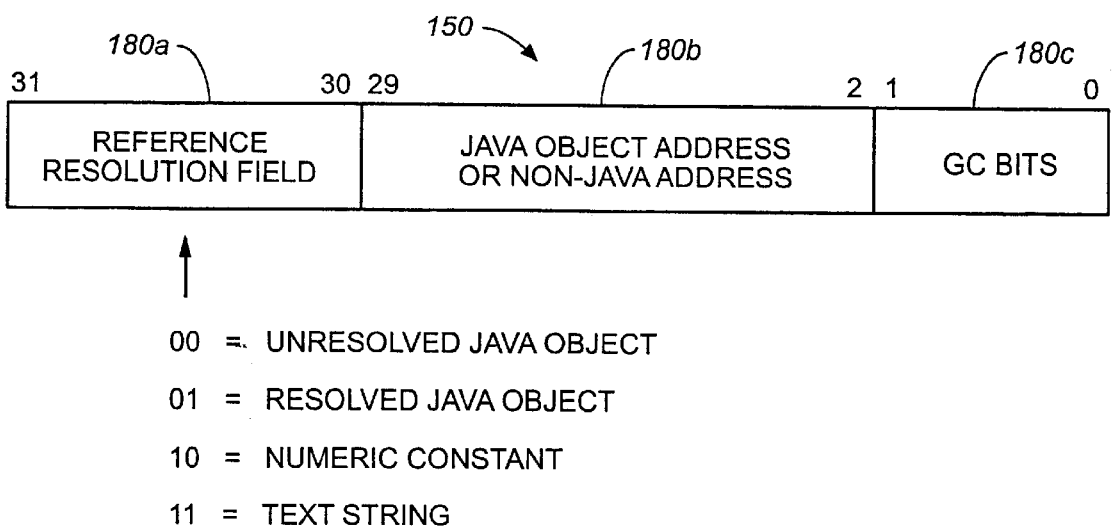
FIG._10

CONSTANT POOL REFERENCE RESOLUTION METHOD

RELATED U.S. APPLICATIONS

This application is a continuation-in-part of the application "Java Virtual Machine Hardware for RISC and CISC Processors", Ser. No. 09/208,741, filed Dec. 8, 1998.

BACKGROUND OF THE INVENTION

Java™ is an object oriented programming language developed by Sun Microsystems. The Java language is small, simple and portable across platforms and operating systems, both at the source and at the binary level. This makes the Java programming language very popular on the Internet.

Platform independence and code compaction are the most significant advantages of Java over conventional programming languages. In conventional programming languages, the source code of a program is sent to a compiler which interprets the program into machine code or processor instructions. The processor instructions are native to the system's processor. If the code is compiled on an Intel-based system, the resulting program will only run on other Intel-based systems. If it is desired to run the program on another system, the user must go back to the original source code, obtain a compiler for the new processor, and recompile the program into the machine code specific to that other processor.

Java operates differently. The Java compiler takes a Java program and, instead of generating machine code for a particular processor, generates bytecodes. Bytecodes are instructions that look like machine code, but aren't specific to any processor. To execute a Java program, a bytecode interpreter takes the Java bytecode converts them to equivalent native processor instructions and executes the Java program. The Java byte code interpreter is one component of the Java Virtual Machine.

Having the Java programs in bytecode form means that instead of being specific to any one system, the programs can run on any platform and any operating system as long a Java Virtual Machine is available. This allows a binary bytecode file to be executable across platforms.

Most computer languages, such as C, are compiled languages. All references to objects are resolved before running of the program. Because Java is run from the Virtual Machine, it is possible to operate without having all of the references resolved. The advantage of this arrangement is that it allows for operation of the program or the program is completely downloaded from another location, such as off the Internet.

For example, a Java instruction that invokes 'ABC' may be run when the Class 'ABC' is not loaded into memory. The Invoke instruction must cause the reference to be resolved. This can take a considerable amount of time to resolve the reference each time that the instruction is run. Instructions that reference the constant pool, such as invoke instructions, often can have this problem.

One version of a Java Virtual Machine can reduce this problem with the use of quick variants of bytecodes. The quick variants of bytecodes are not officially part of the Java Virtual Machine specification and are invisible outside specific Java Virtual Machine implementations. When the quick optimization is turned on, each non-quick bytecode resolves the specified item in the constant pool, signals if an item in the constant pool could not be resolved for some reason, turns itself into the quick variant of itself, and then performs its intended operation. Thus, the bytecode is written over by the quick bytecode variant. The next time the code is run, the system assumes that the item in the constant pool has already been resolved, and that this resolution did not produce any errors. The system can then simply performs the intended operation on the resolved item. A discussion of such a system is described in Gosling, U.S. Pat. No. 5,367,685 incorporated herein by reference.

This optimization cannot be run from read-only memory (ROM) because the optimization requires writing over the normal bytecode with its quick variant. Running a program from read-only memory could be quite useful in some circumstances particularly for embedded systems. It is desired to have an improved method of resolving the constant pool references to avoid some of the problems of the prior art.

SUMMARY OF THE INVENTION

The present invention, a Resolution Data Field, is used in the constant pool entries. When a reference to the constant pool is done by a bytecode, the data in the resolution data field acts as an index to a jump table to determine the native code to be run next. The first time a bytecode, which references the constant pool, is run, the data in the resolution data field causes the system to jump to code to resolve the reference. This resolution code could search for the object reference bytecode within the memory. If the object is not within the memory, the system can load the object into memory and then operate in the normal bytecode operation. This system also sets the resolution data field, so as to indicate that the reference has been resolved. An indication of the location of the resolved object is also stored within the constant pool entry. The next time the bytecode is operated on, the data in the resolution data field acts as an index to the jump table which causes a jump to operation code that assumes that the resolution has been resolved. In this way, after the first operation of the bytecode, searching for the object in memory need not be done.

The advantage of the present invention is that it is not required to write the bytecode over with another value, such as a quick bytecode. Thus, the bytecode could be run from read-only memory. The advantage of using a jump table in the preferred embodiment is that the data in the resolution data field need only be added to a base value rather than compared to a value. In most current processors, the add step can be done quicker than a compare step. In an alternate embodiment, a comparison of the data in the resolution data field could be done.

BRIEF DESCRIPTION OF THE DRAWINGS

The present invention may be further understood from the following description in conjunction with the drawings.

FIG. 1 is a diagram of the system of the parent case including the hardware Java accelerator.

FIG. 2 is a diagram illustrating the use of the hardware Java accelerator of the parent case.

FIG. 3 is a diagram illustrating some the details of a Java hardware accelerator of one embodiment of the parent case.

FIG. 4 is a diagram illustrating the details of one embodiment of a Java accelerator instruction translation in the system of the parent case.

FIG. 5 is a diagram illustration the instruction translation operation of one embodiment of the parent case.

FIG. 6 is a diagram illustrating the instruction translation system of one embodiment of the parent case using instruction level parallelism.

FIG. 7 is a table showing one possible list of bytecodes which can cause exceptions in a preferred embodiment of the parent case.

FIG. 8 is a flow chart illustrating the operation of the present invention.

FIG. 9A and 9B are diagrams illustrating the operation of one embodiment of the present invention FIG. 10 is a diagram illustrating one embodiment of the constant pool entry for use with one embodiment of the present invention.

DETAILED DESCRIPTION OF THE PREFERRED EMBODIMENTS

FIGS. 1–7 illustrate the operation of one embodiment of the application of the parent case. FIGS. 8–10 illustrate the operation of the present invention.

FIG. 1 is a diagram of the system 20 showing the use of a hardware Java accelerator 22 in conjunction with a central processing unit 26. The Java hardware accelerator 22 allows part of the Java Virtual Machine to be implemented in hardware. This hardware implementation speeds up the processing of the Java byte codes. In particular, in a preferred embodiment, the translation of the Java bytecodes into native processor instructions is at least partially done in the hardware Java accelerator 22. This translation has been part of a bottleneck in the Java Virtual Machine when implemented in software. In FIG. 1, instructions from the instruction cache 24 or other memory is supplied to the hardware Java accelerator 22. If these instruction are Java bytecode, the hardware Java accelerator 22 can convert these bytecodes into native processor instruction which are supplied through the multiplexer 28 to the CPU. If a non-Java code is used, the hardware accelerator can be by-passed using the multiplexer 26.

The Java hardware accelerator can do, some or all of the following tasks:

1. Java bytecode decode;
2. identifying and encoding instruction level parallelism (ILP), wherever possible;
3. interpreting bytecodes to native instructions;
4. managing the Java stack on a register file associated with the CPU or as a separate stack;
5. generating exceptions on instructions on predetermined Java byte codes;
6. switching to native CPU operation when native CPU code is provided;
7. performing bounds checking on array instructions; and
8. managing the variables on the register file associated with the CPU.

In a preferred embodiment, the Java Virtual Machine functions of bytecode interpreter, Java register, and Java stack are implemented in the hardware Java accelerator. The garbage collection heap and constant pool area can be maintained in normal memory and accessed through normal memory referencing.

The major advantages of the Java hardware accelerator is to increase the speed in which the Java Virtual Machine operates, and allow existing native language legacy applications, software base, and development tools to be used. A dedicated microprocessor in which the Java bytecodes were the native instructions would not have access to those legacy applications.

Although the Java hardware accelerator is shown in FIG. 1 as separate from the central processing unit, the Java hardware accelerator can be incorporated into a central processing unit. In that case, the central processing unit has a Java hardware accelerator subunit to interpret Java bytecode into the native instructions operated on by the main portion of the CPU.

FIG. 2 is a state machine diagram that shows the operation of one embodiment of the parent case. Block 32 is the power-on state. During power-on, the multiplexer 28 is set to bypass the Java hardware accelerator. In block 34, the native instruction boot-up sequence is run. Block 36 shows the system in the native mode executing native instructions and by-passing the Java hardware accelerator.

In block 38, the system switches to the Java hardware accelerator mode. In the Java hardware accelerator mode, Java bytecode is transferred to the Java hardware accelerator 22, converted into native instructions then sent to the CPU for operation.

The Java accelerator mode can produce exceptions at certain Java bytecodes. These bytecodes are not processed by the hardware accelerator 22 but are processed in the CPU 26. As shown in block 40, the system operates in the native mode but the Java Virtual Machine is implemented in the CPU which does the bytecode translation and handles the exception created in the Java accelerator mode.

The longer and more complicated bytecodes that are difficult to handle in hardware can be selected to produce the exceptions. FIG. 7 is a table showing one possible list of bytecodes which can cause exceptions in a preferred embodiment. An implementation of bytecode instruction operations that reference the constant pool is discussed below with respect to FIGS. 8–10.

FIG. 3 is a diagram illustrating details of one embodiment of the Java hardware accelerator of the parent case. The Java hardware accelerator includes Java accelerator instruction translation hardware 42. One embodiment of the Java accelerator instruction translation hardware 42 is described in more detail below with respect to FIG. 4. This instruction translation hardware 42 uses data stored in hardware Java registers 44. The hardware Java Registers store the Java Registers defined in the Java Virtual Machine. The Java Registers contain the state of the Java Virtual Machine, affect its operation, and are updated after each bytecode is executed. The Java registers in the Java virtual machine include the PC, the program counter indicating what bytecode is being executed; Optop, a pointer to the top of the operand stack; Frame, a pointer to the execution environment of the current method; and Vars, a pointer to the first local variable available of the currently executing method. The virtual machine defines these registers to be a single 32-bit word wide. The Java registers are also stored in the Java stack which can be implemented as the hardware Java stack 50 or the Java stack can be stored into the CPU associated register file.

In a preferred embodiment, the hardware Java registers 44 can include additional registers for the use of the instruction translation hardware 42. These registers can include a register indicating a switch to native instructions and a register indicating the version number of the system.

The Java PC can be used to obtain bytecode instructions from the instruction cache 24. In one embodiment the Java PC is multiplexed with the normal program counter 54 of the central processing unit 26 in multiplexer 52. The normal PC 54 is not used during the operation of the Java hardware bytecode translation. In another embodiment, the normal program counter 54 is used as the Java program counter.

The Java registers are a part of the Java Virtual Machine and should not be confused with the general registers 46 or 48 which are operated upon by the central processing unit 26. In one embodiment, the system uses the traditional CPU register file 46 as well as a Java CPU register file 48. When native code is being operated upon the multiplexer 56 connects the conventional register file 46 to the execution logic 26c of the CPU 26. When the Java hardware accelerator is active, the Java CPU register file 48 substitutes for the conventional CPU register file 46. In another embodiment, the conventional CPU register file 46 is used.

As described below with respect to FIGS. 3 and 4, the Java CPU register file 48, or in an alternate embodiment the conventional CPU register file 46, can be used to store portions of the operand stack and some of the variables. In this way, the native register-based instructions from the Java accelerator instruction translator 42 can operate upon the operand stack and variable values stored in the Java CPU register file 48, or the values stored in the conventional CPU register file 46. Data can be written in and out of the Java CPU register file 48 from the data cache or other memory 58 through the overflow/underflow line 60 connected to the memory arbiter 62. The overflow/underflow transfer of data to and from the memory to can done concurrently with the CPU operation. Alternately, the overflow/underflow transfer can be done explicitly while the CPU is not operating. The overflow/underflow bus 60 can be implemented as a tri-state bus or as two separate buses to read data in and write data out of the register file when the Java stack overflows or underflows.

The register files for the CPU could alternately be implemented as a single register file with native instructions used to manipulate the loading of operand stack and variable values to and from memory. Alternately, multiple Java CPU register files could be used: one register file for variable values, another register file for the operand stack values, and another register file for the Java frame stack holding the method environment information.

The Java accelerator controller (co-processing unit) 64 can be used to control the hardware Java accelerator, read in and out from the hardware Java registers 44 and Java stack 50, and flush the Java accelerator instruction translation pipeline upon a "branch taken" signal from the CPU execute logic 26c.

The CPU 26 is divided into pipeline stages including the instruction fetch 26a, instruction decode 26b, execute logic 26c, memory access logic 26d, and writeback logic 26e. The execute logic 26c executes the native instructions and thus can determine whether a branch instruction is taken and issue the "branch taken" signal.

FIG. 4 illustrates an embodiment of a Java accelerator instruction translator which can be used with the parent case. The instruction buffer 70 stores the bytecode instructions from the instruction cache. The bytecodes are sent to a parallel decode unit 72 which decodes multiple bytecodes at the same time. Multiple bytecodes are processed concurrently in order to allow for instruction level parallelism. That is, multiple bytecodes may be converted into a lesser number of native instructions.

The decoded bytecodes are sent to a state machine unit 74 and Arithmetic Logic Unit (ALU) 76. The ALU 76 is provided to rearrange the bytecode instructions to make them easier to be operated on by the state machine 74. The state machine 74 converts the bytecodes into native instructions using the look-up table 78. Thus, the state machine 74 provides an address which indicates the location of the desired native instruction in the look-up table 78 . Counters are maintained to keep a count of how many entries have been placed on the operand stack, as well as to keep track of the top of the operand stack. In a preferred embodiment, the output of the look-up table 78 is augmented with indications of the registers to be operated on at line 80. The register indications are from the counters and interpreted from bytecodes. Alternately, these register indications can be sent directly to the Java CPU register file 48 shown in FIG. 3.

The state machine 74 has access to the Java registers in 44 as well as an indication of the arrangement of the stack and variables in the Java CPU register file 48 or in the conventional CPU register file 46. The buffer 82 supplies the interpreted native instructions to the CPU.

The operation of the Java hardware accelerator of one embodiment of the parent case is illustrated in FIGS. 5 and 6. FIG. 5, section I shows the instruction translation of the Java bytecode. The Java bytecode corresponding to the mnemonic iadd is interpreted by the Java virtual machine as an integer operation taking the top two values of the operand stack, adding them together and pushing the result on top of the operand stack. The Java translating machine interprets the Java bytecode into a native instruction such as the instruction ADD R1, R2. This is an instruction native to the CPU indicating the adding of value in register R1 to the value in register R2 and the storing of this result in register R2. R1 and R2 are the top two entries in the operand stack.

As shown in FIG. 5, section II, the Java register includes a PC value of "Value A" that is incremented to "Value A+1". The Optop value changes from "Value B" to "Value B−1" to indicate that the top of the operand stack is at a new location. The Vars value which points to the top of the variable list is not modified. In FIG. 5, section III, the contents of a Java CPU register file, such as the Java CPU register file 48 in FIG. 3, is shown. The Java CPU register file starts off with registers R0–R5 containing operand stack values and registers R6–R7 containing variable values. Before the operation of the native instruction, register R1 contains the top value of the operand stack. Register R6 contains the first variable. After the execution of the native instruction, register R2 now contains the top value of the operand stack. Register R1 no longer contains a valid operand stack value and is available to be overwritten by a operand stack value from the memory sent across the overflow/underflow line 60 or from the bytecode stream.

FIG. 5, section IV, shows the memory locations of the operand stack and variables which can be stored in the data cache 58 or in main memory. For convenience, the memory is illustrated without illustrating any virtual memory scheme. Before the native instruction executes, the address of the top of the operand stack, Optop, is "Value B". After the native instruction executes, the address of the top of the operand stack is "Value B−1" containing the result of the native instruction. Note that the operand stack value "4427" can be written into register R1 across the overflow/ underflow line 60. Upon a switch back to the native mode, the data in the Java CPU register file 48 should be written to the data memory.

Consistency must be maintained between the Hardware Java Registers 44, the Java CPU register file 48 and the data memory. The CPU 26 and Java Accelerator Instruction Translation Unit 42 are pipelined and any changes to the hardware java registers 44 and changes to the control information for the Java CPU register file 48 must be able to be undone upon a "branch taken" signal. The system preferably uses buffers (not shown) to ensure this consistency. Additionally, the Java instruction translation must be done so as to avoid pipeline hazards in the instruction translation unit and CPU.

FIG. 6 is a diagram illustrating the operation of instruction level parallelism with the parent case. In FIG. 6 the Java bytecodes iload_n and iadd are converted by the Java bytecode translator to the single native instruction ADD R6, R1. In the Java Virtual Machine, iload_n pushes the top local variable indicated by the by the Java register VAR onto the operand stack.

In the parent case the Java hardware translator can combine the iload_n and iadd bytecode into a single native instruction. As shown in FIG. 6, section II, the Java Register, PC, is updated from "Value A" to "Value A+2". The Optop value remains "value B". The value Var remains at "value C".

As shown in FIG. 6, section III, after the native instruction ADD R6, R1 executes the value of the first local variable stored in register R6, "1221", is added to the value of the top of the operand stack contained in register R1 and the result stored in register R1. In FIG. 6, section IV, the Optop value does not change but the value in the top of the register contains the result of the ADD instruction, 1371.

The Java hardware accelerator of the parent case is particularly well suited to a embedded solution in which the hardware accelerator is positioned on the same chip as the existing CPU design. This allows the prior existing software base and development tools for legacy applications to be used. In addition, the architecture of the present embodiment is scalable to fit a variety of applications ranging from smart cards to desktop solutions. This scalability is implemented in the Java accelerator instruction translation unit of FIG. 4. For example, the lookup table 78 and state machine 74 can be modified for a variety of different CPU architectures. These CPU architectures include reduced instruction set computer (RISC) architectures as well as complex instruction set computer (CISC) architectures. The parent case can also be used with superscalar CPUs or very long instruction word (VLIW) computers.

The term Java in the specification or claims should be construed to cover successor programming languages or other programming languages using basic Java concepts (the use of generic instructions, such as bytecodes, to indicate the operation of a virtual machine).

FIG. 8 is a flow chart that illustrates the apparatus of one embodiment of the present invention. In step 120, there is a check whether a bytecode references specific data structure, for example the constant pool. Every currently loaded class has a constant pool attached to it. The constant pool is allocated when a class is first loaded, the constants in this pool encode all the names (of variables, methods, and so forth) used by any method in the class. The class contains a count of how many constants there are and the start of the constant pool is available to the Java bytecodes. The bytecodes that reference the constant pool and include load constant instructions (ldc, ldc_w, ldc2_w ), anewarray allocation, multinewarray allocation, getfield operations, putfield operations, getstatic operations, putstatic operations, the invoke operations (invoke interface operations, invoke special operations, invoke static operations and invoke virtual operations), new operation, checkcast operations, and instanceof operations.

Step 120 is preferably done in hardware as described with respect to FIGS. 1–7 above. The references to the constant pool are software exceptions for that hardware implementation. Alternately, the present invention of FIGS. 8–10 can be completely implemented in software.

If the bytecode does not reference a constant pool, other steps 122 are done. If the bytecode does reference a constant pool, in step 124, data is obtained from the specific data structure, i.e. the constant pool, including data from a resolution data field. The data from the resolution data field is used as an index to a jump table. In steps 126 and 128, the operation of the jump table checks whether the reference is resolved. If the reference is resolved, the system jumps to do the normal operation on the resolved reference in block 130. If the reference is not resolved, the system jumps to the resolution operation to check whether the object referred to is in memory. If the object referred to is not in memory, the object is loaded into memory in step 132. The data in the data structure is modified to indicate in step 134 that the reference is resolved. Thus, the constant pool entry will indicate the location of the found or loaded reference. The resolution data field is also set, so as to indicate that the reference is resolved. In step 136, the bytecode is done upon the resolved reference. Step 138 indicates getting the next bytecode. Note that the system moves to steps 126 and 128 since the resolution data field is set. The resolution data field will indicate that the reference is resolved.

Details of one embodiment of the present invention is shown with respect to FIG. 9A and 9B. Looking at FIG. 9A, different elements stored in the memory are shown. In the bytecode region 150, includes a bytecode 150a that references the constant pool 152. The operation of the invoke instruction has as one of its arguments, the index which points to entry 152a in the constant pool 152. The constant pool entries include a resolution data field 160 and indication field 162. In this case, the indication '5002' points to address '5002' that contains the data 'ABC'. The resolution data field 160 indicates that the reference to the object has not been resolved. The first time that the instruction invoke 150a is run, the system obtains a string 'ABC' and uses the data in the data resolution field 160 as an index to the jump table 170. The '0' data in the data resolution field 160 causes the system to jump to location '9000' in the native instruction region 172. At address '9000', the resolve instructions include code for the object search, the loading of the object if not in memory, the modification of the constant pool, and the normal invoke operations. FIG. 9B illustrates the operation of the native instruction starting at address '9000'. The object 'ABC' was not found in memory so is loaded starting at location '7500'. The address of the loaded object 174 is placed into the in the field 162' of constant pool entry 152a. The data in the data resolution field 160' is modified to '1'. The invoke bytecode 150a is not modified.

The next time the invoke bytecode 150a is run, the data in the data resolution field 160' will cause a jump in the jump table 170 to location '9500'. This will be the native instruction for the invoke instruction. The contents of the field 162' indicates the location of the loaded object 174. Note that there can be different jump tables and instruction regions for each specific bytecode instruction referencing the constant pool.

FIG. 10 illustrates one embodiment of a constant pool entry 180. The constant pool entry 180 includes a field 180b for the Java object address or nonJava address, also shown as the reference resolution field 180a, The reference resolution field can also indicate whether the reference is to a Java object. In one embodiment, "00" indicates an unresolved Java object, "01" indicates a resolved Java object, "10" indicates a numeric constant, and "11" indicates a text string. Field 180c contains garbage collection bits.

While the present invention has been described with reference to the above embodiments, this description of the preferred embodiments and methods is not meant to be construed in a limiting sense. It should also be understood that all aspects of the present invention are not to be limited to the specific descriptions, or to configurations set forth herein. Variations in the present invention will be apparent

We claim:

1. A method of executing an instruction comprising:

obtaining from an instruction storage location, an instruction that references a data structure, the data structure storing an indication of a reference that may need resolution;

obtaining data from the data structure including data from a resolution data field;

using data from resolution data field as an index to a jump table to determine whether to do a resolving step; and thereafter, if the data in the data resolution field indicates that the reference was not resolved, resolving the reference and, thereafter, modifying the data in the data structure including modifying the data in the resolution data field to indicate that the reference is resolved, wherein the data in the instruction storage location is not modified.

2. The method of claim 1, wherein the instruction comprises a bytecode.

3. The method of claim 1, wherein the data structure is a constant pool entry.

4. The method of claim 3, wherein the instruction includes an indexed reference to the constant pool entry.

5. The method of claim 4, wherein the reference is an invoke reference.

6. The method of claim 1, wherein the indication of a reference points to a label of an object that may or may not be loaded into memory.

7. The method of claim 1, wherein the resolving step includes searching for an object in memory.

8. The method of claim 7, further comprising loading the object into memory.

9. The method of claim 8, further comprising storing, in the data structure, an indication of a memory location that the object is stored into memory.

10. The method of claim 1, wherein the jump table contains addresses of regions of native code in memory.

11. A method of executing an instruction comprising:

obtaining from an instruction storage location, an instruction that references an entry in a constant pool, the constant pool entry storing an indication of a reference that may need resolution;

obtaining data from the constant pool entry including data from a resolution data field;

using data from the resolution data field to determine whether to do a resolving step; and thereafter, if the data in the data resolution field indicates that the reference was not resolved, resolving the reference and, thereafter, modifying the data in the constant pool entry including modifying the data in the resolution data field to indicate that the reference is resolved, wherein the data in the instruction storage location is not modified.

12. The method of claim 11, wherein data from the resolution data field is used as an index to a jump table to determine whether to do a resolving step.

13. The method of claim 12, wherein the jump table contains addresses of regions of native code in memory.

14. The method of claim 11, wherein the instruction comprises a bytecode.

15. The method of claim 11, wherein the instruction includes an indexed reference to the constant pool entry.

16. The method of claim 15, wherein the reference is an invoke reference.

17. The method of claim 11, wherein the indication of a reference points to a label of an object that may or may not be loaded into memory.

18. The method of claim 11, wherein the resolving step includes searching for an object in memory.

19. The method of claim 18, further comprising loading the object into memory.

20. The method of claim 18, further comprising storing, in the constant pool entry, an indication of a memory location that the object is stored into memory.

21. The method of claim 11, further comprising the step of examining instructions to determine which instructions reference the constant pool.

22. The method of claim 21, wherein the examining step is implemented in hardware.

* * * * *